(12) United States Patent
Parker

(10) Patent No.: US 9,586,647 B1
(45) Date of Patent: Mar. 7, 2017

(54) BICYCLE PROPULSION SYSTEM

(71) Applicant: Rodger Dwaine Parker, Santa Rosa Valley, CA (US)

(72) Inventor: Rodger Dwaine Parker, Santa Rosa Valley, CA (US)

( * ) Notice: Subject to any disclaimer, the term of this patent is extended or adjusted under 35 U.S.C. 154(b) by 0 days.

(21) Appl. No.: 14/935,108

(22) Filed: Nov. 6, 2015

(51) Int. Cl.
  *B62M 1/24* (2013.01)
  *B62K 23/08* (2006.01)
(52) U.S. Cl.
  CPC ............... *B62M 1/24* (2013.01); *B62K 23/08* (2013.01)
(58) Field of Classification Search
  CPC .................................. B62M 1/24; B62K 23/08
  See application file for complete search history.

(56) References Cited

U.S. PATENT DOCUMENTS

| | | | |
|---|---|---|---|
| 5,388,847 A * | 2/1995 | Trammell, Jr. .......... | B62K 5/05 280/215 |
| 6,527,677 B2 * | 3/2003 | Maresh .............. | A63B 22/0664 482/51 |
| 7,293,789 B1 * | 11/2007 | Efros ....................... | B62M 1/28 280/243 |
| 7,938,423 B2 * | 5/2011 | Schwartz ........... | A63B 22/0002 280/282 |
| 7,988,169 B2 * | 8/2011 | Baek ...................... | B62K 3/002 280/221 |
| 8,857,839 B2 * | 10/2014 | Scolari ................... | B62K 3/002 280/244 |

* cited by examiner

*Primary Examiner* — Kevin Hurley
*Assistant Examiner* — Marlon A Arce
(74) *Attorney, Agent, or Firm* — Arent Fox LLP

(57) ABSTRACT

Some embodiments of the present invention disclose a bicycle propulsion system. The propulsion system includes a frame. The propulsion system includes a wheel rotably coupled to the frame. The propulsion system includes a drive wheel for rotating the wheel. The propulsion system has a pedal. The propulsion system includes a crank lever having a proximate end coupled to the frame and a distal end coupled to the pedal. The propulsion system includes a cam rotably coupled to the crank lever between the distal and proximate ends, wherein the cam comprises a pair of connecting members that when connected form a shaft positioned away from a center of the cam. The propulsion system includes a drive lever having a proximate end comprising a cam follower interfaced to the cam and a distal end coupled to the drive wheel.

18 Claims, 5 Drawing Sheets

BICYCLE PROPULSION SYSTEM

BACKGROUND

Field

The present disclosure relates generally to propulsion mechanisms for bicycles; more particularly to propulsion mechanisms for bicycles that propel the bicycle wheels by rectilinear reciprocation of the pedals.

Background

Conventional bicycles use a common propulsion mechanism consisting of pedal on a crank driving a round crank gear that is connected to sprockets by a chain that drives the rear wheel of the bike. While this common mechanism has been generally successful, it has some shortcomings. For instance, the circular motion of the pedals is less efficient because the drive is only able to produce maximum power during the time in which the rider's tibia is perpendicular to the crank. That is, because torque is maximized when the direction of the foot's force and the direction of the crank are perpendicular, maximum torque is only achieved once per crank revolution on a conventional bicycle. Thus, it is difficult to produce a bicycle propulsion system that allows the rider to power the bicycle with a crank mechanism that maximizes torque, moves fluidly, uses a mechanism with relatively few parts in order to generate greater power than a conventional bicycle power drive, and maintains the same feel operational feel of a conventional bicycle.

SUMMARY

Several aspects of the present invention will be described more fully hereinafter with reference to various apparatuses.

Some embodiments of the present invention disclose a bicycle propulsion system. The propulsion system includes a frame. The propulsion system includes a wheel rotably coupled to the frame. The propulsion system includes a drive wheel for rotating the wheel. The propulsion system has a pedal. The propulsion system includes a crank lever having a proximate end coupled to the frame and a distal end coupled to the pedal. The propulsion system includes a cam rotably coupled to the crank lever between the distal and proximate ends, wherein the cam comprises a pair of connecting members that when connected form a shaft positioned away from a center of the cam. The propulsion system includes a drive lever having a proximate end comprising a cam follower interfaced to the cam and a distal end coupled to the drive wheel.

It should be noted that, for purposes of conciseness, several peripheral aspects of the invention are not detailed in this discussion. A variety of materials, fasteners, accessories, and variations on the above configuration are available and within the contemplation of the invention. Also for conciseness, numerous variations on the invention, which make it more useable for specific types of bicycles and gear mechanisms are contemplated by the invention but not specifically disclosed.

It is understood that other aspects of apparatuses will become readily apparent to those skilled in the art from the following detailed description, wherein various aspects of apparatuses and methods are shown and described by way of illustration. As understood by one of ordinary skill in the art, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of apparatuses will now be presented in the detailed description by way of example, and not by way of limitation, with reference to the accompanying drawings, wherein:

FIG. 4A is an illustration in perspective view of the propulsion mechanism while the left crank is in its highest position.

FIG. 4B is an illustration in perspective view of the propulsion mechanism as the left crank begins to descend from its highest position.

FIG. 4C is an illustration in perspective view of the propulsion mechanism as the left crank approaches its lowermost position.

FIG. 4D is an illustration in perspective view of the propulsion mechanism while the left crank is in its lowermost position and the right crank is in its highest position.

DETAILED DESCRIPTION

In the following detailed description of various embodiments of the invention, numerous specific details are set forth in order to provide a thorough understanding of various aspects of one or more embodiments of the invention. However, one or more embodiments of the invention may be practiced without these specific details. In other instances, well-known methods, procedures, and/or components have not been described in detail so as not to unnecessarily obscure aspects of embodiments of the invention.

In the following description, certain terminology is used to describe certain features of one or more embodiments of the invention. For instance, "bicycle" refers to any manually powered device, including exercise bicycles, consisting of a light frame mounted on wheels, and having a seat, handlebars for steering, brakes, and two pedals and "gear mechanism" refers to any of the external or internal gear hubs in single or multi-gear configurations, freewheel mechanisms, or other such mechanisms, used in propelling bicycles.

An object of the present invention is to provide a bicycle propulsion system that optimizes the benefits of linear motion over that of rotational motion to propel a bicycle. This may be accomplished by replacing the crank levers and chain ring of a conventional bicycle powered by rotational motion from a rider with a crank lever capable of powering the bicycle through rectilinear motion. In doing so, a cam may be necessary to maintain consistent rotational force on the rear wheel and enable fluid linear movement on the pedals, providing a rider with a more comfortable experience.

Figure 1:
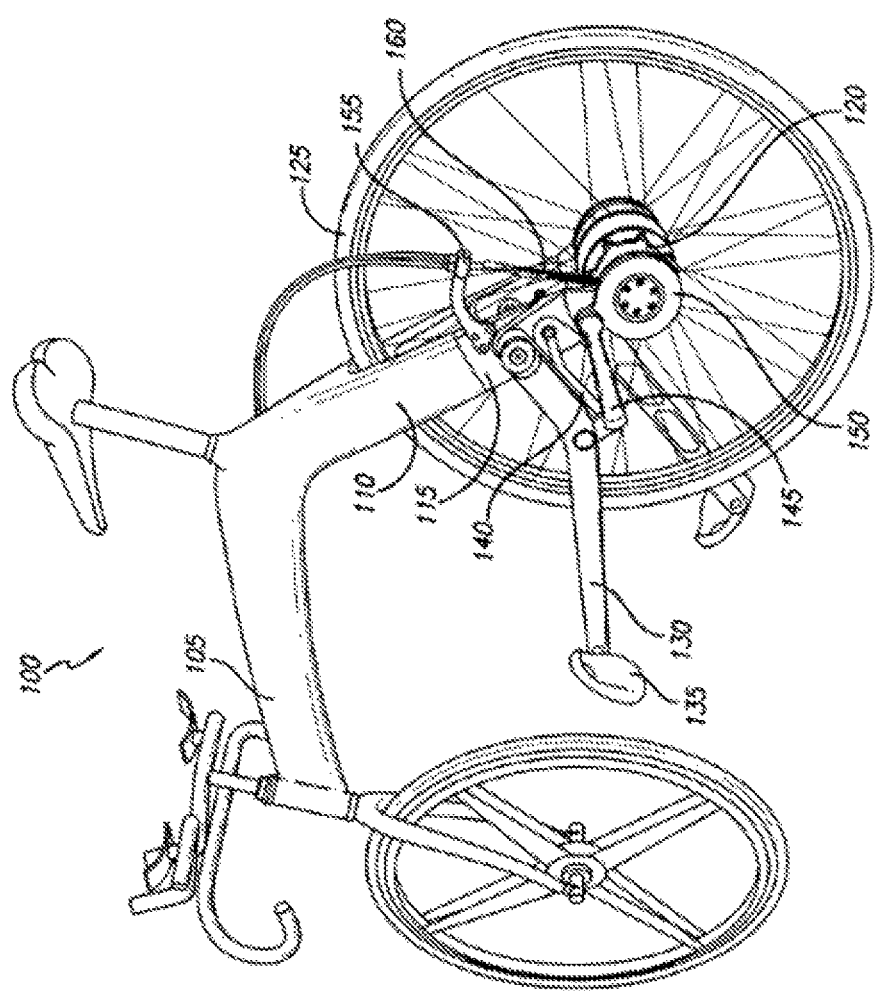
FIG. 1 is an illustration in perspective view of a bicycle that uses one embodiment of the propulsion mechanism.

FIG. 1 is an illustration in perspective view of a bicycle 100 that uses one embodiment of the propulsion mechanism.

A bicycle frame 105 is shown, which attaches the propulsion mechanism at the lowermost portion of the seat stays 110 of the bicycle frame 105. The frame stems 115 serves to mount the major components of the propulsion mechanism and the rear wheel hub 120 and rear wheel 125. The major components of the propulsion mechanism include the crank levers 130, which mount the pedals 135, the guide levers 140, the drive arms 145, and the drive wheels 150. The pedals 135 are configured to be located at approximately the location of the bottom bracket on conventional bicycles. On application of force to the pedals 135 by the rider, the crank levers 130 are depressed and transmit a force to the drive arms 145, which in turn, rotate the drive wheels 150. When the crank levers 130 approach their lowermost or highest position in the cycle, the guide levers 140 serve to change the direction of the crank levers. In this manner, the crank levers 130 are kept in constant motion. The motion of the pedals 135 is approximately rectilinear, as the length of the crank levers 130 is high relative to the distance which they displace vertically. This length allows the rider a great deal of leverage in applying force to the pedals 135. As the drive wheel 150 is rotated, it drives a gear mechanism, which, in turn, drives the rear wheel 125. The frame stems 155 can be used to mount accessories, such as a cable holder 155 for the gearing cables 160. The rear wheel 125 may utilize a free wheel mechanism. For instance, when the pedals 135 are not receiving any force from the rider, the drive wheel will no longer drive the rear wheel 125. However, the rear wheel 125 will continue to rotate without applying any force to the pedals 135. Thus, the pedals 135 may remain stationary while the rear wheel 125 continues to propel the bicycle. As will be discussed in the following paragraphs, since a freewheel mechanism does not generate torque, it may be necessary to design the propulsion mechanism so that power is consistently applied to the rear wheel 125 such that the propulsion mechanism does not experience a lock up.

Figure 2:
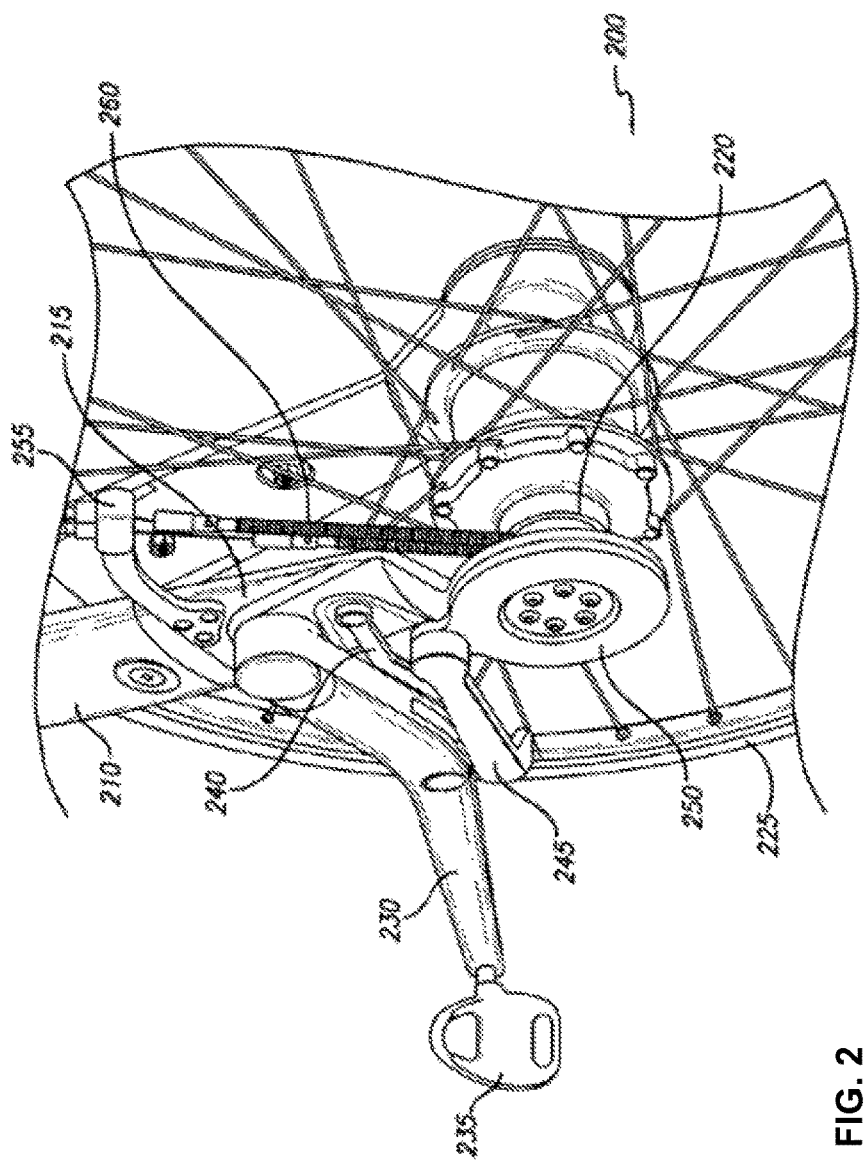
FIG. 2 is an illustration in close-up, perspective view of one embodiment of the propulsion mechanism.

FIG. 2 is an illustration in close-up, perspective view of one embodiment of the propulsion mechanism. A propulsion mechanism is attached at the lowermost portion of the seat stays 210 of a bicycle frame. The frame stems 215 serve to mount the major components of the propulsion mechanism and the rear wheel hub 220 and rear wheel 225. In the illustrated embodiment, the rear wheel hub 220 mounts an internal gear mechanism. The invention, however, remains adaptable to any of the gearing mechanisms known within the art. The major components of the propulsion mechanism include the crank levers 230, which mount the pedals 235, the guide levers 240, the drive arms 245, and the drive wheels 250. As shown, proximate ends of the crank levers 230 are coupled to the frame stems 215 and the distal ends are coupled to the pedals 235. Between the proximate and distal ends of the crank levers 230, the drive arms 245 are coupled to the crank levers 230. On application of force to the pedals 235 by the rider, the crank levers 230 are depressed and transmit a force to the drive arms 245, which in turn, rotate the drive wheels 250. When the crank levers 230 approach their lowermost or highest position in the cycle, the guide levers 240 serve to change the direction of the crank levers. In this manner, the crank levers 230 are kept in constant motion. As the drive wheel 250 is rotated, it drives a gear mechanism, which, in turn, drives the rear wheel 225. The frame stems 255 may also be used to mount accessories, such as a cable holder 255 for the gearing cables 260.

As will be discussed in the following figures, in circumstances where the drive arms are horizontally opposed to each other, the propulsion mechanism may experience a system lockup. For instance, during a power stroke, one of the crank levers 230 may be moved from its uppermost position to its lowermost position, the corresponding drive arm 345 causes the corresponding drive wheel 250 to rotate 180 degrees. In such instances, the other (opposing) crank lever 230 may simultaneously raise to its uppermost position, causing the corresponding drive arm 345 to cause the corresponding drive wheel 250 to rotate 180 degrees. At this point, the drive arms 345 are horizontally opposed to each other by 180 degrees and the propulsion mechanism is locked with one of the crank levers 230 in its uppermost position and the other, opposing, crank lever 230 in its lowermost position. As will be discussed in the following paragraphs, it is possible to prevent the above described horizontal lockup by mechanically modifying the crank lever drive angles at uppermost and lowermost ends of the power stroke discussed above.

Figure 3:
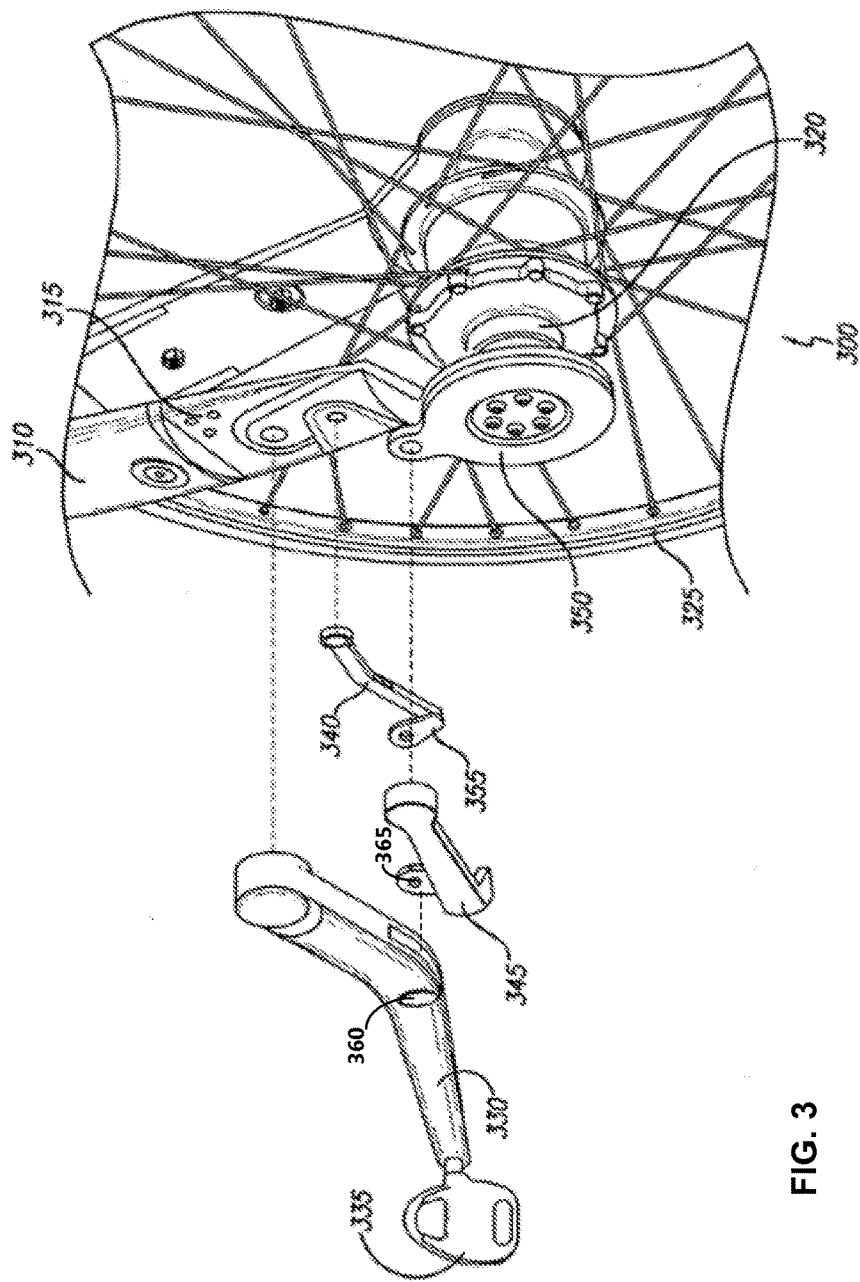
FIG. 3 is an exploded view of one embodiment of the propulsion mechanism.

FIG. 3 is an exploded view of one embodiment of a propulsion mechanism 300. In this illustration, the many components of the propulsion mechanism are shown, which are similar to many of the components described in FIG. 2. Such components including the frame stems 315, which mount to the bicycle frame at the lowermost portion of the seat stays 310, the rear wheel hub 320, the rear wheel 325, the crank levers 330, the pedals 335, the guide lever 340, the drive arm 345, the drive wheel 350. The propulsion mechanism 300 also includes a pitman arm 355, and a second portion 360 of a cam. In one embodiment of the invention, the pitman arm 355 serves to couple the guide lever 340 to the crank levers 330. Additionally, in some embodiments, the pitman arm 355 may have adjustable attachment locations so that the motion of the crank levers 330 can be adjusted to suit the ergonomic needs of particular riders.

As illustrated the second portion 360 of the cam may be inserted in a hole between the distal and proximal ends of the pedal. The drive arm 345 may be inserted in an opening in the crank lever 330. As will be discussed below, the first portion of the cam 360 and the pitman arm 355 comprise parts of a cam, which serves to modify the drive-angle of the crank lever 335 to remove the potential for a system lock up.

FIG. 4A through FIG. 4D illustrate the motion of one embodiment of the propulsion mechanism through one half-cycle of the cranks' motion. It should be noted that, unlike conventional bicycle drive mechanisms, throughout the crank levers' displacement cycle, they remain essentially perpendicular to the rider's tibia, allowing for greater torque to be transmitted to the crank levers. (This is because torque is at its greatest when the direction of force is perpendicular to the direction of the lever). What is more, because the propulsion mechanism utilizes longer crank levers than conventional bicycle drive mechanisms, the torque is further increased. (This is because torque is directly proportional to the length of the lever).

Figure 4A:
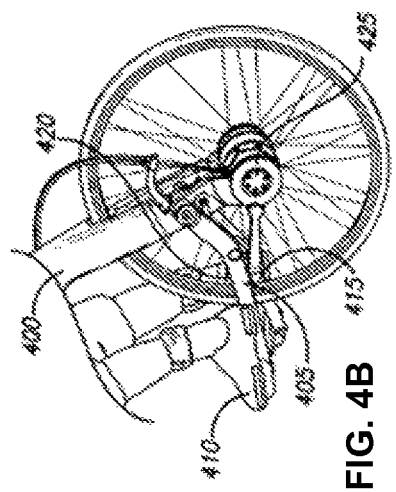
FIG. 4A through FIG. 4D illustrate the motion of one embodiment of the propulsion mechanism through one half-cycle of the cranks' motion.

FIG. 4A is an illustration in perspective view of the propulsion mechanism while the left crank 405 is in its highest position. A bicycle frame 400 is shown, which mounts the propulsion mechanism. In this figure, the left crank 405 and the rider's left leg 410 are in their highest position. Meanwhile, the right crank 415 and rider's right leg 420 are in their lowermost position. It should be noted that the drive wheel 425 is at its starting position.

Figure 4B:
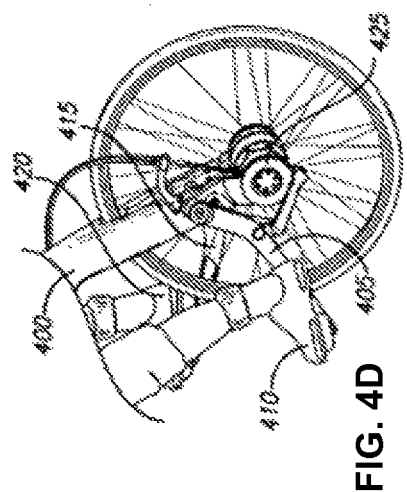

FIG. 4B is an illustration in perspective view of the propulsion mechanism as the left crank 405 begins to descent from its highest position. A bicycle frame 400 is shown, which mounts the propulsion mechanism. In this figure, the left crank 405 and the rider's left leg 410 begin their descent from their highest position. Meanwhile, the right crank 415 and rider's right leg 420 begin to rise from their lowermost position. As the crank levers move, the drive wheel 425 rotates and drives the rear wheel of the bicycle.

Figure 4C:
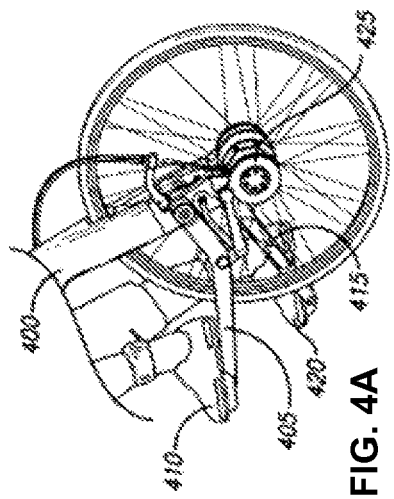

FIG. 4C is an illustration in perspective view of the propulsion mechanism as the left crank 405 approaches its lowermost position. A bicycle frame 400 is shown, which mounts the propulsion mechanism. In this figure, the left crank 405 and the rider's left leg 410 approach their lowermost position in the crank's cycle. Meanwhile, the right crank 415 and rider's right leg 420 rise towards their highest position in the cycle. As the crank levers move, the drive wheel 425 continues to rotate and drives the rear wheel of the bicycle.

Figure 4D:
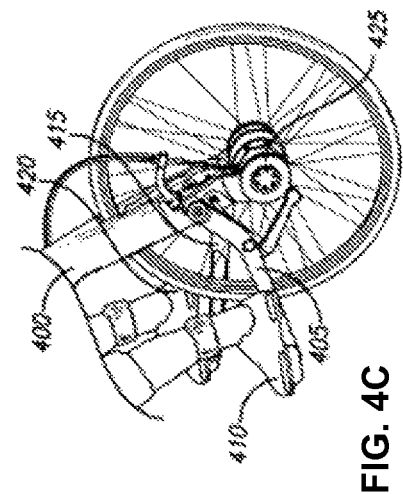

FIG. 4D is an illustration in perspective view of the propulsion mechanism while the left crank 405 is in its lowermost position and the right crank is in its highest position. A bicycle frame 400 is shown, which mounts the propulsion mechanism. In this figure, the left crank 405 and the rider's left leg 410 are in their lowermost position. Immediately following this position, the left crank 405 begins to rise. Meanwhile, the right crank 415 and rider's right leg 420 are at their highest position. Following this position, the right crank 415 will begin to descend. It should be noted that, in this position, the drive wheel 425 has rotated 180 degrees relative to its position in FIG. 4A, when the cycle began.

Figure 5:
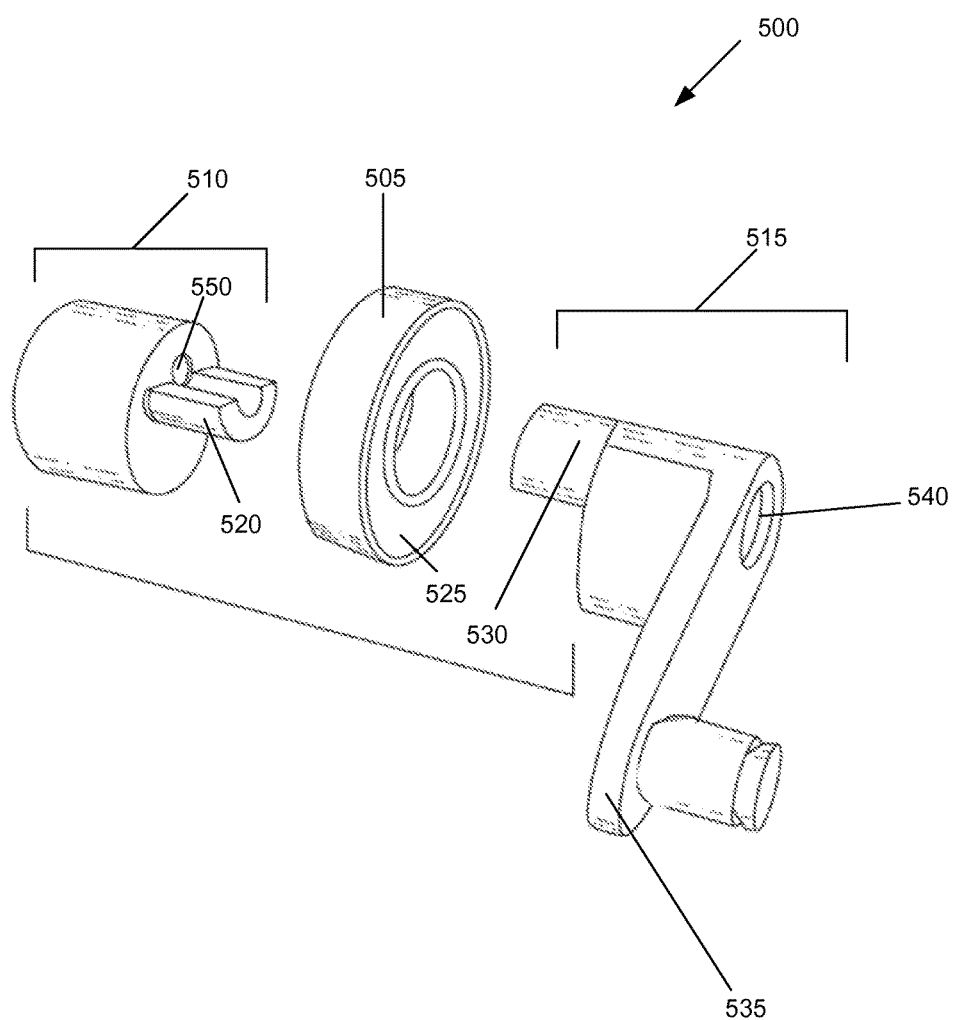
FIG. 5 is an illustration of a cam of the propulsion mechanism.

FIG. 5 is an illustration of a cam 500 configured to operate in the bicycle propulsion mechanism. Much of the description of FIG. 5 will be described in relation to FIG. 3. As shown, the cam 500 has a first portion 515, a second portion 510, a lobe 505, a bearing 525, holes 540 and 545, a pitman arm 535, and connecting members 520 and 530, which when connected form a shaft. The first portion 510 may be rotably coupled to a crank lever of the propulsion mechanism such as crank lever 330 described with respect to FIG. 3. The first portion 510 may be similar to the first portion 350, which may be inserted through a hole between the distal and proximal ends of the crank lever 330. Thus, the crank lever may move in a rectilinear fashion without applying any rotational force to the first portion 510 (360) and vice versa. The first and second portions 510, 515 and the lobe 505 may be held together by a fastener inserted into the holes 540 and 550. The fastener may be a screw, bolt, pin, or any other suitable fastener.

When the first portion 510 and the second portion 515 are held together by the fastener, the connecting members 520 and 530 are connected to form a shaft. As illustrated, the shaft may be located, at an outer edge, or away from the center, of the first and second portions 510 and 515. Accordingly, when the lobe 505 is coupled to the shaft formed by the connecting members 520 and 530, the center of the lobe 505 will also be positioned away from the center of the first and second portions 510 and 515 of the cam 500. In some embodiments of the propulsion mechanism, the cam lobe 505 may interface with a cam follower. For instance, the lobe 505 may be inserted into the upper portion of the drive arm 345 described in FIG. 3. In such instances, the upper portion of the drive arm 345 may comprise the cam follower. This allows the lobe to apply a linear force to the drive arm 345. Thus, the cam 500 converts rotational motion to linear motion, such that the drive arm 345 moves in a linear fashion. The drive arm 345 then converts the linear motion to rotational motion as applied to the drive wheel 350 so that the drive wheel can power the rear wheel 325.

In some embodiments of the propulsion mechanism, when rectilinear motion is applied to the crank levers, the cam 500 may rotate back and forth. As the cam 500 rotates, so does the shaft formed by the connecting members 520 and 530. Since the shaft is positioned along the outer edge of the first and second portions 510 and 515, the lobe 505 is pushed out and pulled back during a power stroke. Such a power stroke may occur when a crank arm moves from its uppermost to lowermost position or vice versa. During the power stroke, the push and pull movement of the lobe 505 serves to modify the drive angle of the crank levers so that the distal end of the drive arm is not horizontally opposed to the opposing drive end at the end of any power stroke. For instance, the propulsion mechanism may have a pair of crank levers and drive arms. Cams may interface with the cam follower portions of the drive arms. As one crank lever reaches its uppermost position, the cam lobe and cam follower may cause the drive arm to rotate the drive wheel, where the drive arm starts at a position of minus 10 degrees along the drive wheel and completes the rotation at 190 degrees along the drive wheel. At this point, the crank lever may be at its lowest position. As the crank lever begins to reach the lowest position, the opposing drive arm may receive a rotational force from the opposing drive wheel, causing the crank lever to begin to lower from its uppermost position. Those skilled in the art will appreciate that the same actions may be performed on either side of the bicycle. Additionally, those skilled in the art will also appreciate that although the above example describes a crank lever approaching its lowermost position, the same description applies when one of the crank levers approaches the uppermost position. For instance, when one of the crank leaves approaches its uppermost position, the opposing crank lever will begin to rise from the opposing crank lever's lowermost position. Thus, propulsion mechanism is designed such that the crank levers avoid horizontal opposition, thereby preventing a system lockup.

One advantage of the bicycle propulsion system is that the linear, or vertical, pedal motion described above is that force of gravity can assist with the downward power stroke for a longer period of time than would be the case of a conventional bicycle with a round crank gear. The gravity assist, along with the rider's weight, translates to greater forward energy throughout the entire power stroke. Whereas, a conventional bicycle only uses the gravity assist for approximately ⅓ of the power stroke. Accordingly, the rest of the force provided during the power stroke on a convention bicycle is provided by the rider without any gravity assist. Accordingly, the bicycle propulsion system provides a more efficient power stroke so that the rider can conserver more energy, while realizing greater speed than the rider would achieve on a conventional bicycle.

Additionally, the pedal motion described above provides an ergonomic advantage. Specifically, the design described above softens the up-and-down motion directional changes, which mimics a walking or running action performed by the rider. For instance, as one foot may begin to touch the ground, the other foot is in the process of moving up and forward to prepare for the next step. Thus, the above description of the bicycle propulsion system also provides for a smoother and more natural ride for the rider. For instance, to a rider, the bicycle propulsion system maintains the same feel, or mechanical operating consistency, expected by a rider accustomed to riding a conventional bicycle having the round crank gear and chain to power the rear wheel. In such instances, the bicycle propulsion system maintains the ability to coast or free-wheel when linear force is no longer being applied to the crank lever, much like a conventional bicycle will continue to coast when pedaling stops.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for" or, in the case of a method claim, the element is recited using the phrase "step for."

What is claimed is:

1. A bicycle propulsion system comprising:
    a frame;
    a wheel rotably coupled to the frame;
    a drive wheel for rotating the wheel;
    a pedal;
    a crank lever having a proximate end coupled to the frame and a distal end coupled to the pedal;
    a cam rotably coupled to the crank lever between the distal and proximate ends, wherein the cam comprises a pair of connecting members that when connected form a shaft positioned away from a center of the cam; and
    a drive lever having a proximate end comprising a cam follower interfaced to the cam and a distal end coupled to the drive wheel.

2. The bicycle of claim 1, wherein the shaft is positioned at an edge of the cam.

3. The bicycle of claim 2, wherein the shaft is configured to apply a protruding and receding force on the cam follower in response to linear motion from the crank lever.

4. The bicycle of claim 2, wherein the cam follower is rotably coupled to the connecting members.

5. The bicycle of claim 1, further comprising a pitman arm coupled to the cam and a guide lever having a proximal end and a distal end, the proximal end of the guide lever rotably coupled to the pitman arm and the distal end of the guide arm rotably coupled to the frame.

6. The bicycle of claim 1, wherein the frame comprises a first side and a second side opposite the first side, wherein the first and second sides each comprise first and second crank levers, first and second cams, first and second drive levers, first and second pedals, and first and second drive wheels respectively.

7. The bicycle of claim 6, wherein the first and second cams are configured to apply a variable rotational force to the respective drive levers in order to position the distal end of one of the drive levers at an angle other than 180 degrees from the distal end of the opposing drive lever.

8. The bicycle of claim 1, wherein the crank levers are configured for reciprocal rectilinear motion comprising a highest position and a lowest position opposite the highest position.

9. The bicycle of claim 8, wherein the cams are configured to apply a variable rotational force when the crank lever coupled to the cam is positioned at the lowest position.

10. The bicycle of claim 8, wherein the variable rotational force prevents the first and second drive wheels from locking.

11. The bicycle of claim 8, wherein when either one of the first and second crank levers is at the lowest position, the opposing crank lever is configured to advance in a downward direction while the pedal in the lowest position is configured to advance upward at a slower rate than a downward advancing rate of the opposing crank lever.

12. A bicycle propulsion system comprising:
    a frame;
    a wheel rotably coupled to the frame;
    a drive wheel for rotating the wheel;
    a pedal;
    a crank lever having a proximate end coupled to the frame and a distal end coupled to the pedal;
    a cam rotably coupled to the crank lever between the distal and proximate ends; and
    a drive lever having a proximate end comprising a cam follower interfaced to the cam and configured to apply a reciprocating rectilinear force to the drive lever in response to motion from the crank lever.

13. The bicycle of claim 12, wherein the connecting portion of the cam comprises a pair of interlocking members located away from the center of the cam.

14. The bicycle of claim 13, wherein the interlocking members, when connected, are configured to apply a protruding and receding force to the cam follower in response to linear motion from the crank lever.

15. The bicycle of claim 13, wherein the cam follower is rotably coupled to the interlocking members.

16. The bicycle of claim 12, wherein the cam is configured to provide a protruding and receding influence on the drive lever such that the drive lever extends and retracts causing the drive wheel to maintain a continuous rotational motion.

17. The bicycle of claim 12, further comprising a pitman arm compled to the cam and a guide lever having a proximal end and a distal end, the proximal end of the guide lever rotably coupled to the pitman arm and the distal end of the guide arm rotably coupled to the frame.

18. The bicycle of claim 12, wherein the cam is configured to prevent the drive wheel from locking up.

* * * * *